(12) United States Patent
Manoukian et al.

(10) Patent No.: US 10,239,632 B2
(45) Date of Patent: Mar. 26, 2019

(54) SYSTEM AND METHOD FOR CONTROLLING AN AUXILIARY POWER UNIT INLET DOOR

(71) Applicant: PRATT & WHITNEY CANADA CORP., Longueuil (CA)

(72) Inventors: Patrick Manoukian, Saint-Laurent (CA); Sarah Theriault, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/440,586

(22) Filed: Feb. 23, 2017

(65) Prior Publication Data

US 2018/0237153 A1    Aug. 23, 2018

Related U.S. Application Data

(60) Provisional application No. 62/461,076, filed on Feb. 20, 2017.

(51) Int. Cl.
*B64D 41/00* (2006.01)
*B64D 33/02* (2006.01)

(52) U.S. Cl.
CPC ...... *B64D 41/00* (2013.01); *B64D 2033/0213* (2013.01)

(58) Field of Classification Search
CPC ................................ B64D 41/00; F02C 7/286
See application file for complete search history.

(56) References Cited

U.S. PATENT DOCUMENTS

| | | | |
|---|---|---|---|
| 6,272,838 B1 | 8/2001 | Harvell et al. | |
| 6,349,899 B1 | 2/2002 | Ralston | |
| 6,901,737 B2 | 6/2005 | Schnoor | |
| 7,364,116 B2 | 4/2008 | Nguyen et al. | |
| 7,469,545 B2* | 12/2008 | Riley | B64D 41/00 244/53 B |
| 7,540,142 B2 | 6/2009 | Sheoran et al. | |
| 8,061,650 B2* | 11/2011 | Nguyen | B64D 41/00 244/58 |
| 8,079,550 B2 | 12/2011 | Brill et al. | |
| 8,141,816 B2 | 3/2012 | Robbins et al. | |
| 8,439,061 B2 | 5/2013 | Baumann | |
| 8,967,530 B2 | 3/2015 | Gatzke | |
| 9,327,600 B1* | 5/2016 | Nehmeh | B60L 1/00 |
| 9,611,050 B2* | 4/2017 | Tretow | B64D 33/02 |
| 2008/0279675 A1* | 11/2008 | Ullyott | F01D 21/06 415/1 |
| 2010/0293961 A1* | 11/2010 | Tong | F01D 19/00 60/778 |

(Continued)

*Primary Examiner* — Alex C Dunn
(74) *Attorney, Agent, or Firm* — Norton Rose Fulbright Canada LLP

(57) ABSTRACT

A system and method for controlling an inlet door of an auxiliary power unit (APU) are provided. It is determined whether a condition to inhibit a start of the APU is present. If no condition to inhibit the start of the APU is present, a door-opening signal comprising instructions to cause the inlet door to be commanded to an open position in advance of a prospective command to start the APU is output. If the condition to inhibit the start of the APU is present, a door-closing signal comprising instructions to cause the inlet door to be commanded to a closed position is output.

9 Claims, 6 Drawing Sheets

(56) References Cited

U.S. PATENT DOCUMENTS

| | | | |
|---|---|---|---|
| 2013/0074519 A1* | 3/2013 | Ertz | F02C 9/16 |
| | | | 60/802 |
| 2015/0251770 A1* | 9/2015 | Bisson | B64D 31/06 |
| | | | 244/58 |
| 2016/0090915 A1* | 3/2016 | Wolff | B64D 41/00 |
| | | | 60/794 |
| 2016/0355275 A1* | 12/2016 | Seger | F02C 7/32 |
| 2017/0335711 A1* | 11/2017 | Marcus | F01D 17/12 |

* cited by examiner

US 10,239,632 B2

SYSTEM AND METHOD FOR CONTROLLING AN AUXILIARY POWER UNIT INLET DOOR

CROSS-REFERENCE TO RELATED APPLICATIONS

This patent application claims priority under 35 USC § 119(e) of U.S. provisional Application Ser. No. 62/461,076, filed on Feb. 20, 2017, the contents of which are hereby incorporated by reference.

TECHNICAL FIELD

The application relates generally to auxiliary power units and, more particularly, to controlling an auxiliary power unit inlet door.

BACKGROUND OF THE ART

An auxiliary power unit (APU) may be provided with an inlet door that is moveable between a closed position and one or more open positions to allow airflow into the APU and accordingly provide the desired APU functionalities. In some existing systems, movement of the APU inlet door is initiated after an APU start command has been received and the absence of any condition to inhibit APU start has been confirmed. This however increases the time from the moment that the APU start command is received to the moment the APU is ready to be loaded. There is therefore a need for an improved system and method for controlling an auxiliary power unit inlet door.

SUMMARY

In one aspect, there is provided a method for controlling an inlet door of an auxiliary power unit. The method comprises determining whether a condition to inhibit a start of the auxiliary power unit is present, if no condition to inhibit the start of the auxiliary power unit is present, outputting a door-opening signal comprising instructions to cause the inlet door to be commanded to an open position in advance of a prospective command to start the auxiliary power unit, and, if the condition to inhibit the start of the APU is present, outputting a door-closing signal comprising instructions to cause the inlet door to be commanded to a closed position.

In another aspect, there is provided a system for controlling an inlet door of an auxiliary power unit. The system comprises a memory and a processing unit coupled to the memory and configured to determine whether a condition to inhibit a start of the auxiliary power unit is present, if no condition to inhibit the start of the auxiliary power unit is present, output a door-opening signal comprising instructions to cause the inlet door to be commanded to an open position in advance of a prospective command to start the auxiliary power unit, and, if the condition to inhibit the start of the APU is present, output a door-closing signal comprising instructions to cause the inlet door to be commanded to a closed position.

In a further aspect, there is provided a computer readable medium having stored thereon program code executable by a processor for determining whether a condition to inhibit a start of an auxiliary power unit is present, if no condition to inhibit the start of the auxiliary power unit is present, outputting a door-opening signal comprising instructions to cause the inlet door to be commanded to an open position in advance of a prospective command to start the auxiliary power unit, and, if the condition to inhibit the start of the APU is present, outputting a door-closing signal comprising instructions to cause the inlet door to be commanded to a closed position.

DESCRIPTION OF THE DRAWINGS

Reference is now made to the accompanying figures in which.

DETAILED DESCRIPTION

Figure 1:
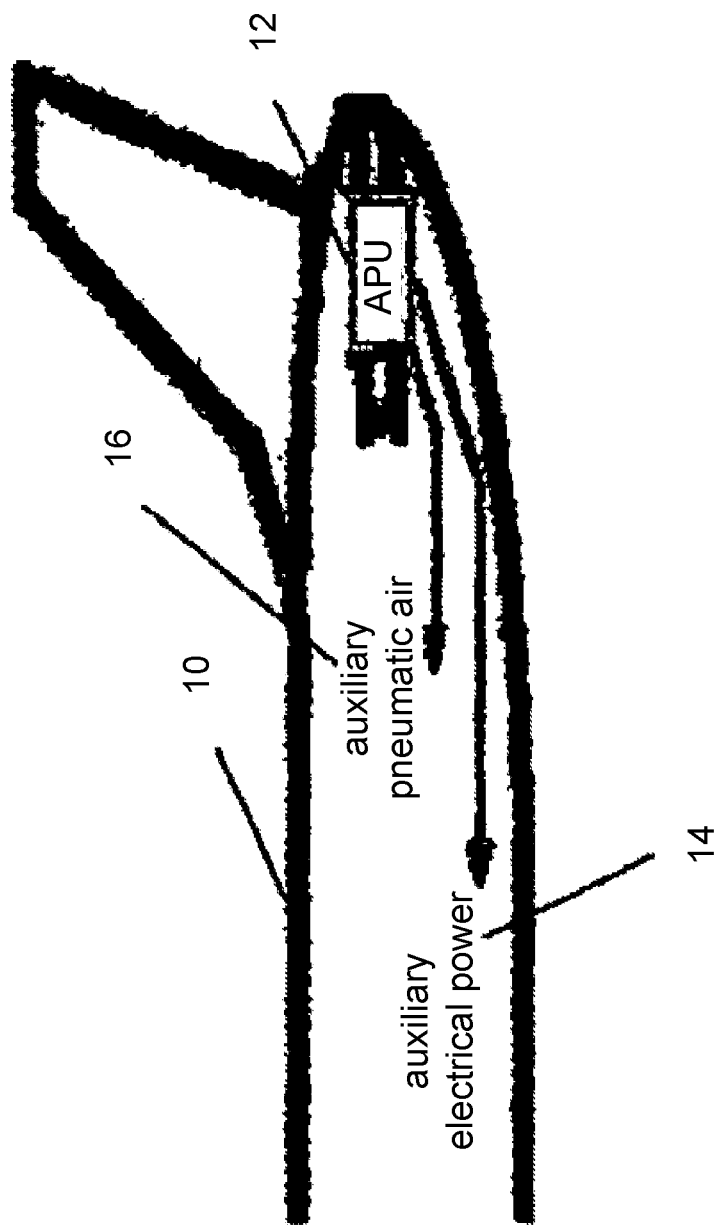
FIG. 1 is a schematic representation of an aircraft including an APU, in accordance with an illustrative embodiment.

Referring to FIG. 1, in one embodiment, an aircraft 10 has mounted thereon an APU 12, which is provided for conventional purposes, including, but not limited to, the provision of electrical power 14 and pneumatic air 16 to the aircraft 10. Among other well-known uses, pneumatic air 16 provided by the APU 12 is used on larger aircraft to provide auxiliary bleed air for starting the aircraft's main engines (not shown).

Figure 2:
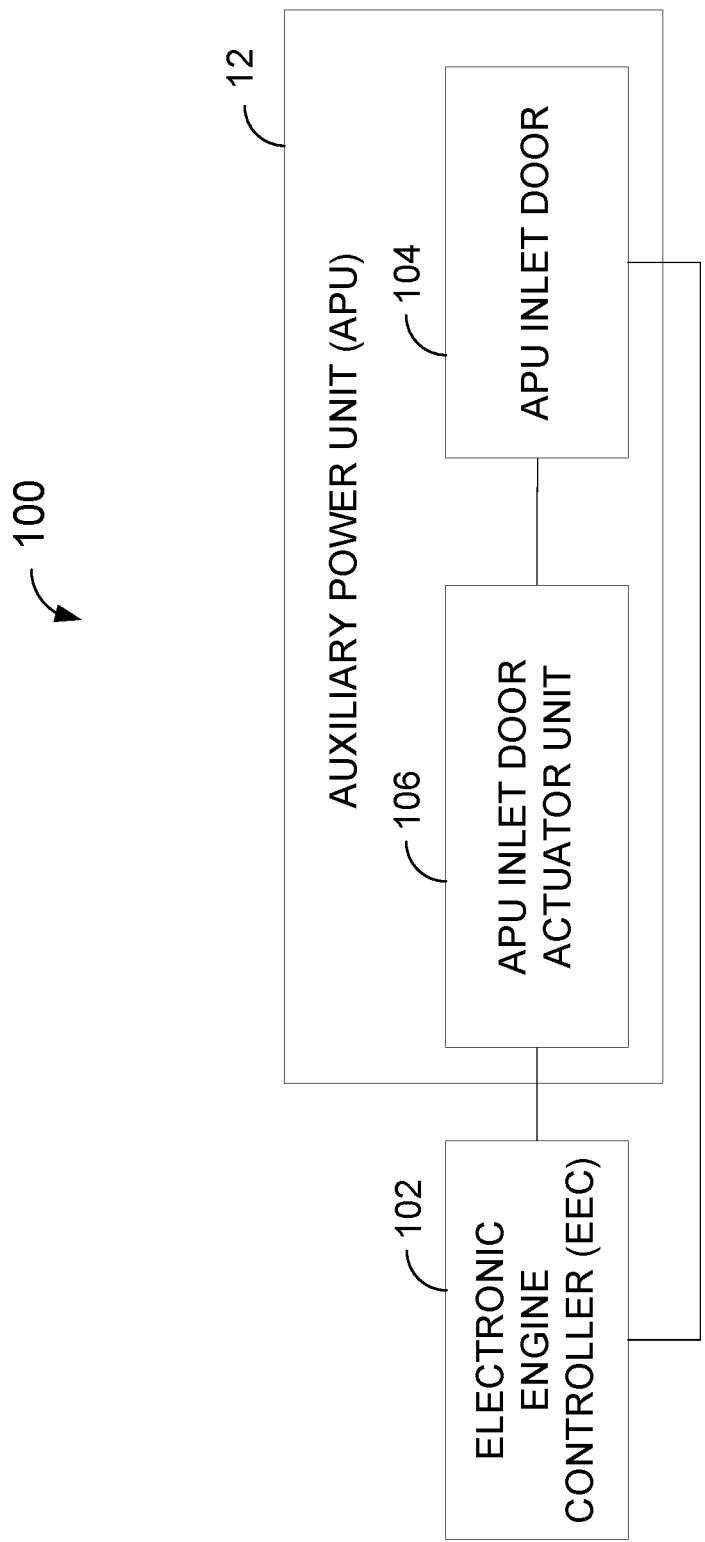
FIG. 2 is a block diagram of a system for controlling an inlet door of the APU of FIG. 1, in accordance with an illustrative embodiment.

FIG. 2 illustrates an example system 100 for controlling an inlet door of a gas turbine engine, such as the APU 12 of FIG. 1. The system 100 comprises an Electronic Engine Controller (EEC) 102, which controls the APU 12.

In one embodiment, in operation, the APU 12 successively enters a number of operating states, namely a power-up state, a watch state, a start state, a running state, a cool-down state, and a shutdown state. In one embodiment, operation of the APU 12 is controlled by an aircraft master switch (not shown) having three positions, namely an "Off" position, a "Start" position, and an "On" position. When the master switch is momentarily set to the start position, the EEC 102 initiates an APU start. The APU 12 then remains in operation as long as the master switch is in the "On" position. When the master switch is set to the "Off" position, the EEC 102 initiates a cool-down period having a predetermined duration. In one embodiment, the predetermined duration is sixty (60) seconds. It should be understood that other suitable durations may apply. The EEC 102 then shuts down the APU 12 after the cool-down period has elapsed. It should be understood that the APU shutdown may also be initiated in an emergency situation, e.g. upon being initiated by the EEC 102 or in response to an emergency shutdown being commanded.

In one embodiment, the master switch also controls a power supply to the EEC 102. In particular, power is applied to the EEC 102 when the master switch is in the "On" position or the "Start" position. When the master switch is set to the "Off" position, a timer is initiated and power removed from the EEC 102 upon expiry of the timer. In one embodiment, the timer is a 170 second timer. It should be understood that other suitable timers may apply.

Although reference is made herein to a master switch for controlling operation of the APU 12, it should be understood that other embodiments may apply. For example, discrete signals (rather than switch positions) may be used to implement the "On", "Off", and "Start" commands.

Still referring to FIG. 2, the EEC 102 also controls the APU's inlet door 104. For this purpose, the EEC 102 sends commands (e.g. in the form of one or more control signal(s)) to an APU inlet door actuator unit 106, which in turn causes the APU inlet door 104 to be operated as commanded. The commands sent by the EEC 102 may comprise a "Not Powered" command, which results in the APU inlet door 104 not being commanded to any of the predetermined positions. The commands sent by the EEC 102 may also comprise position commands, which cause the APU inlet door 104 to be moved to one or more commanded positions. In particular, the APU inlet door 104 is moved between a closed position and one or more open positions in which air is allowed to flow into the APU to provide desired APU functionality. It is desirable for the APU inlet door 104 to be open while the APU is running but closed when the APU is not operating so as to reduce drag to the aircraft in flight and prevent foreign object ingestion while on ground.

It should be understood that a suitable open position is selected depending on flight conditions. In particular, the APU inlet door 104 may be moved to a "Fully Open" position (e.g. having a thirty-five (35) degrees opening angle) when the aircraft is on the ground while the door may be moved to a "Partially Open" position (e.g. having a thirty (30) degrees opening angle) when the aircraft is in flight. During normal operation, the EEC 102 selects the inlet door opening angle based on the aircraft's airborne status and causes the door position to be transitioned at the end of the APU start in order to allow for immediate load application. The EEC 102 also receives from the APU inlet door actuator unit 106 and/or the APU inlet door 104 feedback that allows the EEC 102 to monitor a position of the APU inlet door 104 in real-time.

As will be discussed further below, the system and method described herein allow to anticipate the APU start by opening the APU inlet door 104 in advance of a prospective trigger (e.g. a pilot command) to start the APU. For example, the APU inlet door 104 can be opened when the pilot wishes to test the inlet door's operation. As discussed herein, an APU start is possible (i.e. not inhibited) if no operational fault which would cause a shutdown of the APU 12 or prevent an APU start is present and no emergency shutdown of the APU 12 has been commanded. In one embodiment, operational faults which would cause a shutdown of the APU 12 or prevent an APU start include, but are not limited to, underspeed, overspeed, overtemperature, loss of critical signal(s) (e.g. from all speed sensors, exhaust thermocouples, and the like), Modular Avionics Unit (MAU) Aeronautical Radio INC. (ARINC) bus faults, internal faults of the Full Authority Digital Engine Control (FADEC), FADEC power interrupt, and issues with the aircraft's oil system (e.g. low oil pressure, high oil temperature, and the like).

Alternatively, the system and method described herein close the APU inlet door 104 if no APU start is immediately possible (i.e. it is unlikely that an APU start will be performed), during APU shutdown, or if the APU start has been cancelled. In particular, the APU inlet door 104 is closed if an emergency shutdown of the APU 12 is commanded, the APU 12 is shutting down due to a pilot command or the presence of an operational fault, the APU 12 is not running and the master switch is in the "Off" position (meaning that the power to the FADEC will soon be removed), or the APU 12 is not running and an operational fault which prevents the APU start is present. As will also be discussed further below, in the event of an APU shutdown, the system and method discussed herein initiate the closure of the APU inlet door 104 at the appropriate time, depending on whether the shutdown results from an emergency stop command or from a normal shutdown (e.g. commanded via the master switch).

Figure 3:
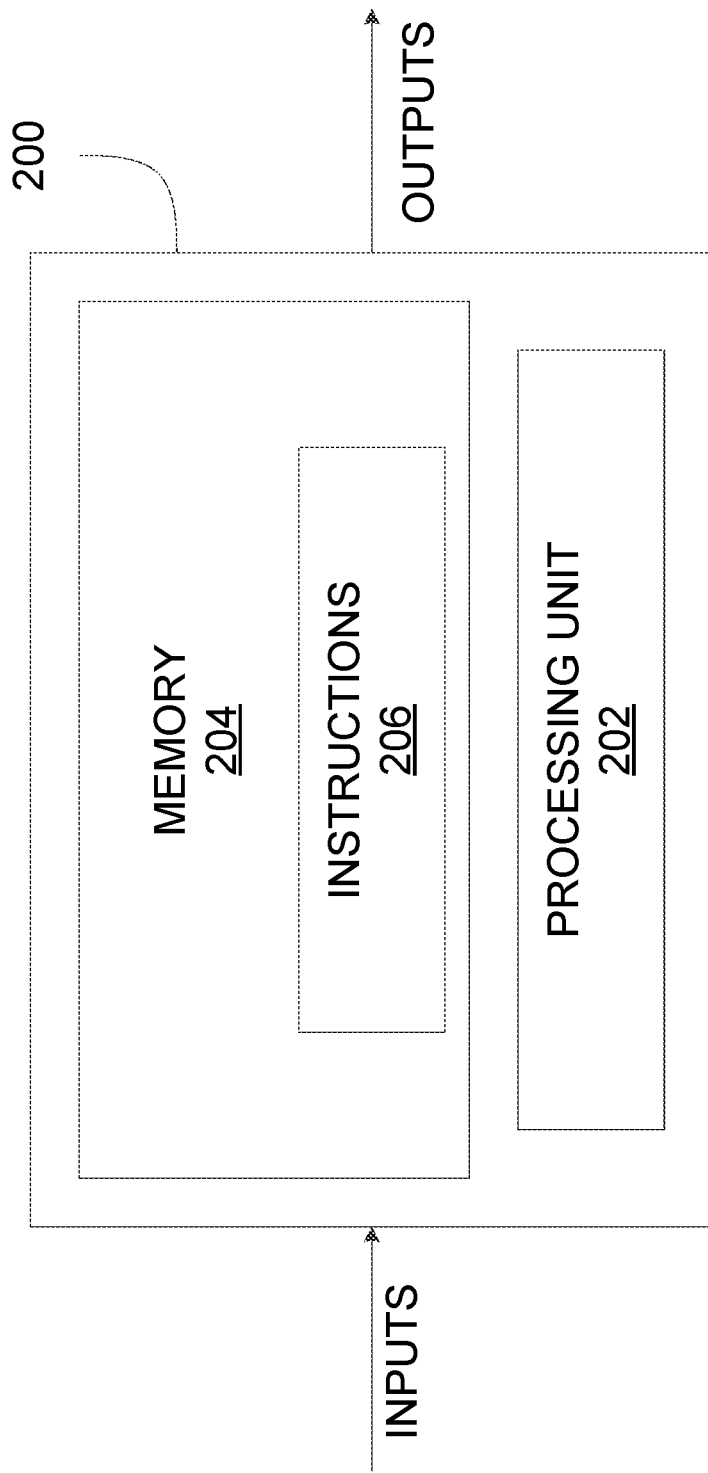
FIG. 3 is a block diagram of a computing device for implementing the electronic engine controller of FIG. 2, in accordance with an illustrative embodiment.

FIG. 3 is an example embodiment of a computing device 200 for implementing the EEC 102 described above with reference to FIG. 2. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 4:
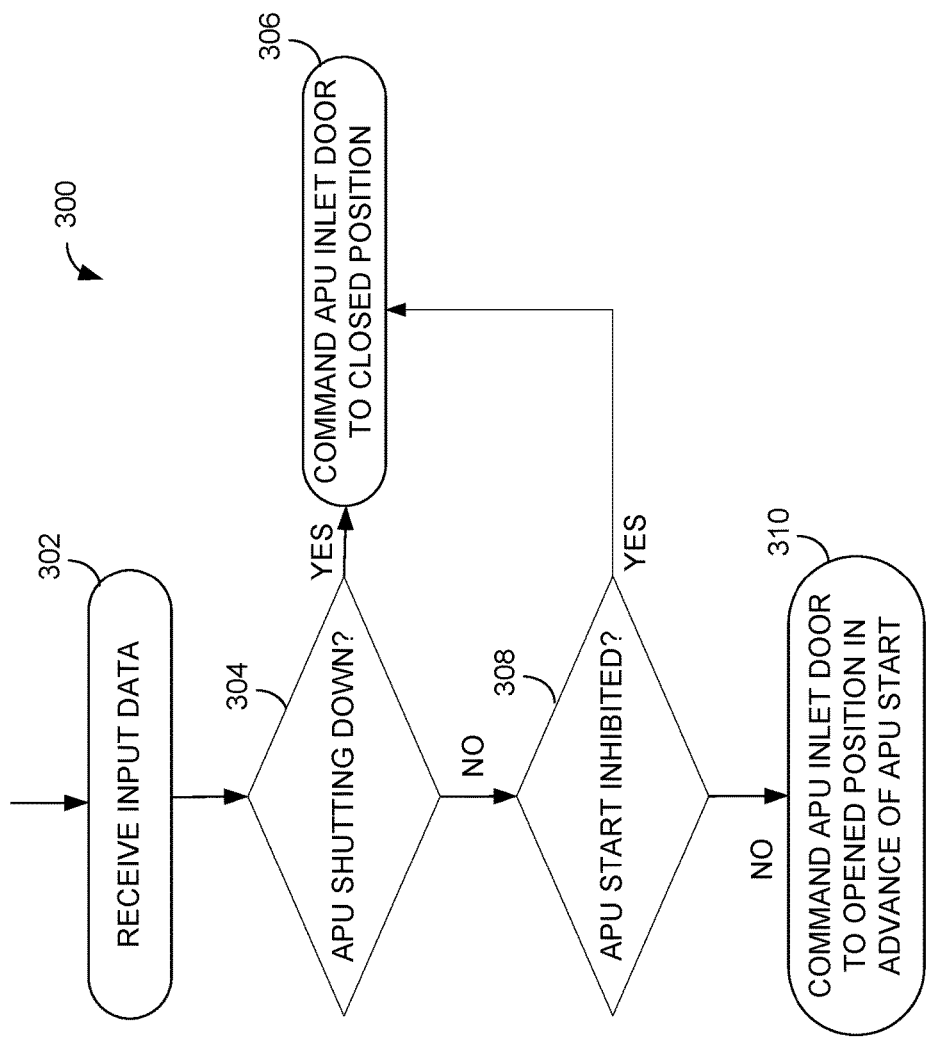
FIG. 4 is a flowchart of a method for controlling an inlet door of the APU of FIG. 1, in accordance with an illustrative embodiment.

Referring now to FIG. 4, an example method 300 for controlling an inlet door of a gas turbine engine will now be described. The method 300 may be implemented by the computing device 200 of FIG. 3. The method 300 comprises the step 302 of receiving input data. The input may be input from the aircraft or input internal to the EEC and, as will be discussed further below, may comprise a current position of the master switch, an indication as to whether emergency shutdown of the APU has been commanded, and an indication as to whether an operational fault which would cause an APU shutdown or prevent an APU start is present. The next step 304 is then to determine from the input data whether the APU is shutting down. If this is the case, the APU inlet door is commanded to the closed position at step 306. As will be discussed further below, in one embodiment, the APU inlet door is commanded to the closed position after evaluating a current speed of the auxiliary power unit and an elapsed time period since the auxiliary power unit has been in the shutdown state. Otherwise, the method 300 determines from the input data whether an APU start is inhibited (step 308), i.e. whether a condition to inhibit the APU start is present. If this is the case (i.e. an APU start is not possible), the APU inlet door is commanded to the closed position (step 306). Otherwise, if an APU start is possible, the APU inlet door is commanded opened in advance of the APU start (step 310), e.g. prior to a prospective start command.

Figure 5:
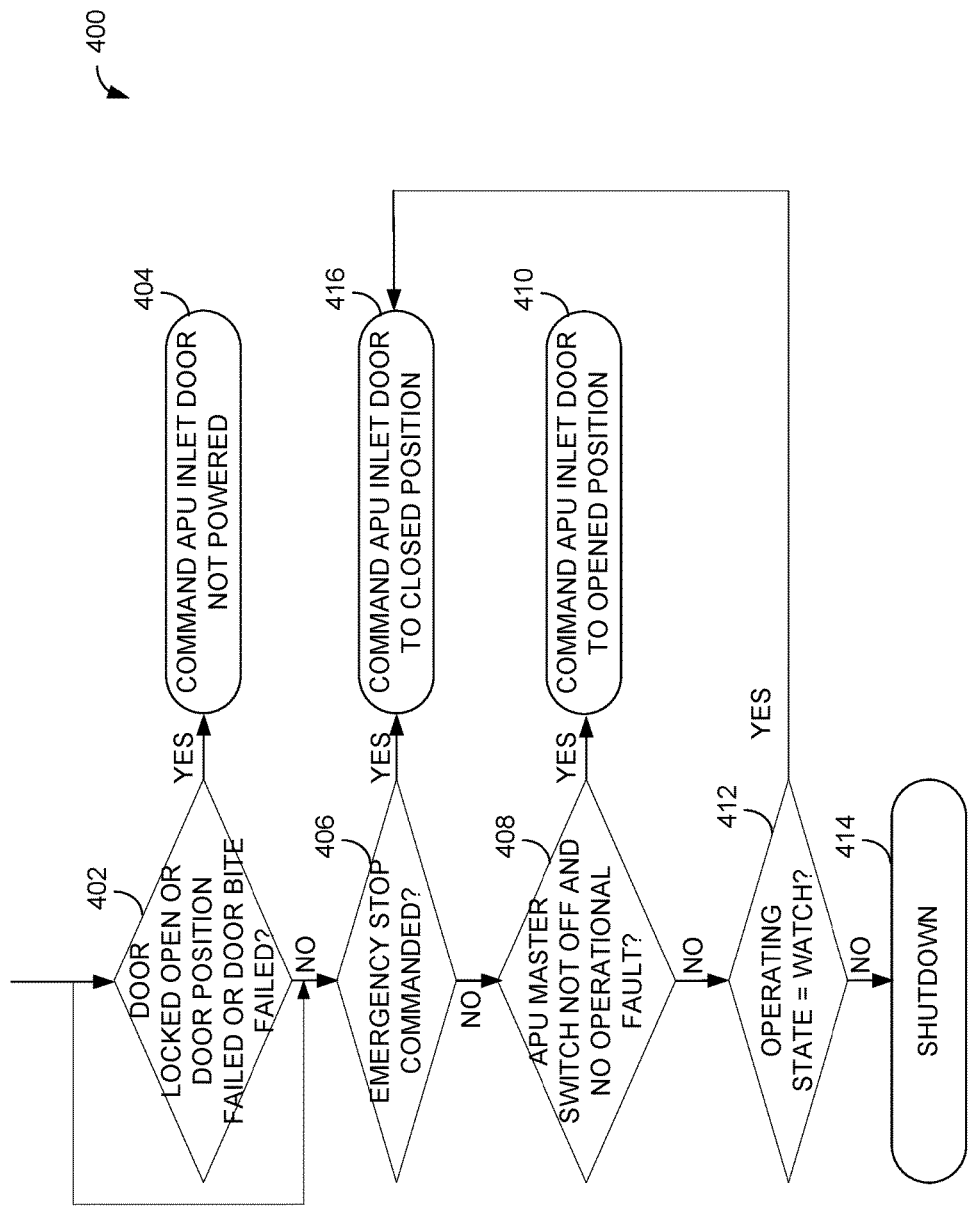
FIG. 5 is a flowchart of an inlet door control method for use when the APU of FIG. 1 is in one of a watch state, a start state, a running state, and a cool-down state, in accordance with an illustrative embodiment.
Figure 6:
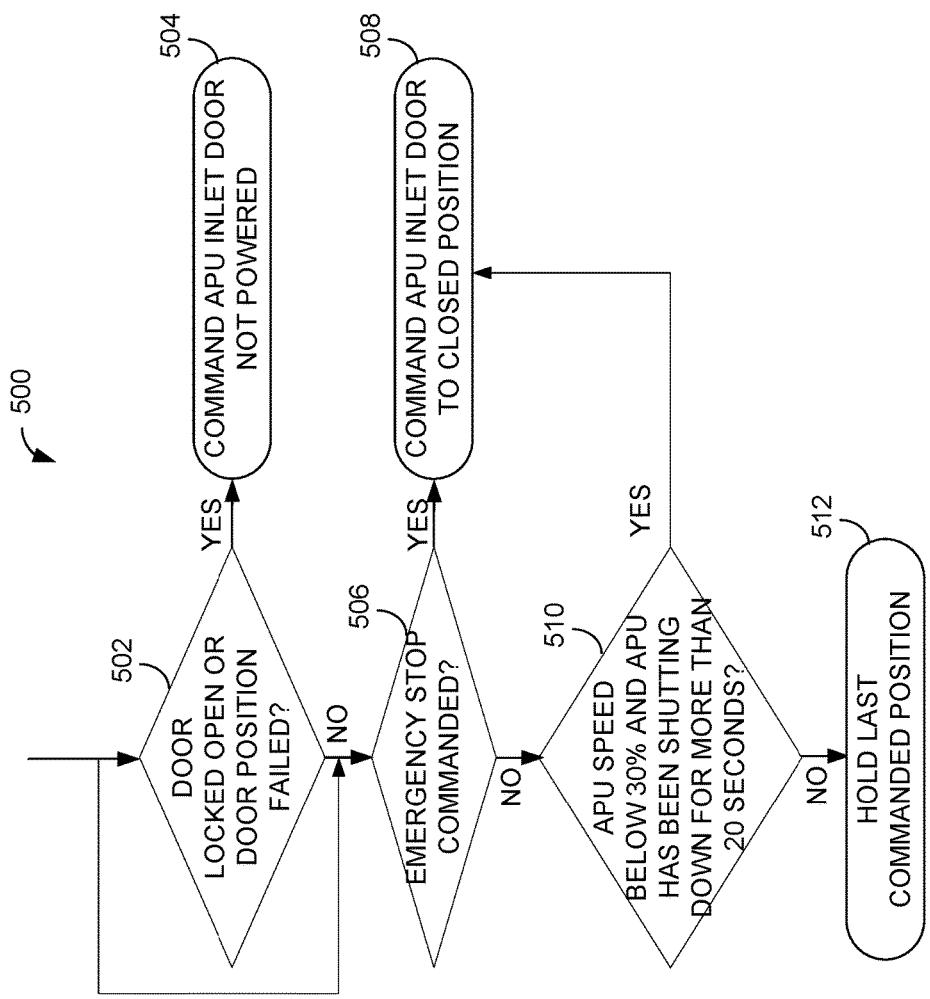
FIG. 6 is a flowchart of an inlet door control method for use when the APU of FIG. 1 is in a shutdown state, in accordance with an illustrative embodiment.

FIG. 5 and FIG. 6 further detail the method 300 of FIG. 4 in accordance with the current operating state of the APU. Referring now to FIG. 5, an inlet door control method 400 applicable when the APU is in the watch state, the start state, the running state, or the cool-down state will now be described. At an optional step 402, the method 400 determines whether the APU inlet door is mechanically locked open, whether an issue has been detected with the inlet door actuator system (referred to in FIG. 5 as "Door position failed"), or if the door control system has failed, or whether the door control system has failed a Built-In-Test-Equipment (or BITE, as described in co-pending U.S. patent application Ser. No. 15/440,494, the contents of which are hereby incorporated by reference) when the APU was initially powered up. The inlet door actuator issues include, but are not limited to, the APU inlet door being stuck in one position, the inlet door actuator not returning any position feedback, or any of the discretes involved in the door command logic having failed a power up stimulation test.

If the result of the assessment performed at step 402 is positive, the control system does not attempt to move the door and the APU inlet door is commanded "Not Powered" at step 404. Otherwise, the next step is to assess whether a condition which would inhibit an APU start or cause an APU shutdown is present. In one embodiment, the conditions which would inhibit the APU start or cause an APU shutdown include an emergency stop command having been sent by the pilot (as assessed at step 406), the APU master switch being in the "Off" position or an operational fault which leads to a shutdown being present (as assessed at step 408). If it is determined at steps 406 and 408 that no condition which would inhibit the APU start or cause an APU shutdown is present, the APU inlet door is commanded open (step 410). Otherwise, it is assessed whether the APU is in the process of shutting down or not (steps 412, 414). If the APU is not in the process of shutting down, the inlet door is commanded closed (step 416).

Referring now to FIG. 6, an inlet door control method 500 applicable when the APU is in the shutdown state will now be described. At an optional step 502, the method 500 determines whether the APU inlet door is mechanically locked open or if an issue has been detected with the inlet door actuator. If this is the case, the APU inlet door is commanded "Not Powered" at step 504. Otherwise, the next step 506 is to determine whether the shutdown was initiated by an emergency stop command sent by the pilot. If this is the case, the APU inlet door is commanded to the closed position (step 508). In one embodiment, closure of the APU inlet door is commanded immediately to ensure that the closure occurs prior to a loss of electrical power from the aircraft.

If the APU is in shutdown state but no emergency stop was commanded by the pilot, the APU speed and time parameters (e.g. the elapsed time since the APU has been shutting down) are monitored prior to commanding the closure of the inlet door. The closing time of the APU inlet door is chosen so as to ensure that the APU inlet door is closed prior to removal of electrical power to the EEC from the aircraft. This in turn avoids having the APU inlet door remain partially open in flight, thereby decreasing the aircraft's drag. The time elapsed prior to closing of the APU inlet door is also selected to optimize ventilation of the APU compartment while minimizing the adverse effects of windmilling. Keeping the door open during shutdown ensures that the APU compartment is sufficiently vented, thereby avoiding APU and ducting damage that may result from uneven thermal expansion or contraction of components, inlet duct collapse, and the like. However, an open inlet door while the aircraft has a forward velocity may induce APU free rotation (or windmilling), which in turn causes undesired circulation of oil through the non-operating engine and engine rotational wear on bearings.

The method 500 thus determines at step 510 whether the APU speed is below a predetermined speed threshold and whether the APU has been shutting down for more than a predetermined time period. In one embodiment, the predetermined speed threshold is 30% and the predetermined time period is twenty (20) seconds. It should be understood that, depending on the type of APU, other suitable speed thresholds and time periods may apply. If it is determined at step 510 that the APU speed is below the speed threshold and the engine has been shutting down for more than the predetermined time period, the APU inlet door is commanded to the closed position (step 508). Otherwise, if the APU speed is not below the speed threshold or the engine has not been shutting down for more than the predetermined time period, the last commanded position is held at step 512.

Using the system and method described herein, the APU inlet door can be commanded using input from the aircraft and irrespective of temperature or pressure. In addition, the APU inlet door can be controlled well in advance of an APU start, regardless of whether the APU start is commanded. This results in a decreased time from the moment the APU start command is received to the moment the APU is ready to be loaded.

The system and method described herein further allow a test of the APU inlet door actuator to be performed without having to perform an APU start. In particular, since the electrical power supplied to the EEC is linked to the position of the aircraft switch to control the APU, as discussed above, the switch can be moved to the "On" position, thereby powering on the EEC. This in turn opens the APU inlet door without starting the APU. Moreover and as discussed above, using the proposed system and method, it can be ensured that the APU inlet door remains closed prior to depowering the EEC. It can also be ensured that the APU inlet door does not remains open when the EEC is no longer active.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for controlling an inlet door of an auxiliary power unit, the method comprising:
  receiving, at a computing device, input data comprising at least one of a current operating state of the auxiliary power unit, an indication as to whether an emergency shutdown of the auxiliary power unit has been commanded, and an indication as to whether at least one operational fault causing a shutdown of the auxiliary power unit is present;
  determining, at the computing device, from the input data, whether a condition to inhibit a start of the auxiliary power unit is present;
  responsive to determining, at the computing device, that no emergency shutdown has been commanded and that no operational fault is present, indicating that no condition to inhibit the start of the auxiliary power unit is present, outputting a door-opening signal comprising instructions to cause the inlet door to be commanded to an open position in advance of a prospective command to start the auxiliary power unit; and responsive to determining, at the computing device, that the condition to inhibit the start of the auxiliary power unit is present, outputting a door-closing signal comprising instructions to cause the inlet door to be commanded to a closed position.

2. The method of claim 1, further comprising determining that the emergency shutdown has been commanded to determine that the condition to inhibit the start of the auxiliary power unit is present.

3. The method of claim 1, further comprising determining that an operational fault preventing the start of the auxiliary power unit is present and that the auxiliary power unit is not running to determine that the condition to inhibit the start of the auxiliary power unit is present.

4. The method of claim 1, further comprising:
   determining that the auxiliary power unit is in a shutdown state to determine that the condition to inhibit the start of the auxiliary power unit is present;
   monitoring a current speed of the auxiliary power unit and an elapsed time period since the auxiliary power unit has been in the shutdown state;
   outputting the door-closing signal if the current speed is below a predetermined speed threshold and the elapsed time period is above a predetermined time threshold; and
   otherwise, outputting a door-holding signal comprising instructions to cause the inlet door to remain in a last commanded position.

5. A system for controlling an inlet door of an auxiliary power unit, the system comprising:
   a memory; and
   a processing unit coupled to the memory and configured to:
      receive input data comprising at least one of a current operating state of the auxiliary power unit, an indication as to whether an emergency shutdown of the auxiliary power unit has been commanded, and an indication as to whether at least one operational fault causing a shutdown of the auxiliary power unit is present;
      determine, from the input data, whether a condition to inhibit a start of the auxiliary power unit is present;
      responsive to determining that no emergency shutdown has been commanded and that no operational fault is present, indicating that no condition to inhibit the start of the auxiliary power unit is present, output a door-opening signal comprising instructions to cause the inlet door to be commanded to an open position in advance of a prospective command to start the auxiliary power unit; and
      responsive to determining that the condition to inhibit the start of the auxiliary power unit is present, output a door-closing signal comprising instructions to cause the inlet door to be commanded to a closed position.

6. The system of claim 5, wherein the processing unit is configured to determine that the emergency shutdown has been commanded to determine that the condition to inhibit the start of the auxiliary power unit is present.

7. The system of claim 5, wherein the processing unit is configured to determine that an operational fault preventing the start of the auxiliary power unit is present and that the auxiliary power unit is currently not running to determine that the condition to inhibit the start of the auxiliary power unit is present.

8. The system of claim 5, wherein the processing unit is configured to:
   determine that the auxiliary power unit is in a shutdown state to determine that the condition to inhibit the start of the auxiliary power unit is present;
   monitor a current speed of the auxiliary power unit and an elapsed time period since the auxiliary power unit has been in the shutdown state;
   output the door-closing signal if the current speed is below a predetermined speed threshold and the elapsed time period is above a predetermined time threshold; and
   otherwise, output a door-holding signal comprising instructions to cause the inlet door to remain in a last commanded position.

9. A non-transitory computer readable medium having stored thereon program code executable by a processor for:
   receiving input data comprising at least one of a current operating state of an auxiliary power unit, an indication as to whether an emergency shutdown of the auxiliary power unit has been commanded, and an indication as to whether at least one operational fault causing a shutdown of the auxiliary power unit is present;
   determining, from the input data, whether a condition to inhibit a start of the auxiliary power unit is present;
   responsive to determining that no emergency shutdown has been commanded and that no operational fault is present, indicating that no condition to inhibit the start of the auxiliary power unit is present, outputting a door-opening signal comprising instructions to cause an inlet door of the auxiliary power unit to be commanded to an open position in advance of a prospective command to start the auxiliary power unit; and
   responsive to determining that the condition to inhibit the start of the auxiliary power unit is present, outputting a door-closing signal comprising instructions to cause the inlet door to be commanded to a closed position.

* * * * *